Feb. 4, 1947.  P. J. MOORE  2,415,187
MEASURING ELEMENT
Filed June 9, 1944
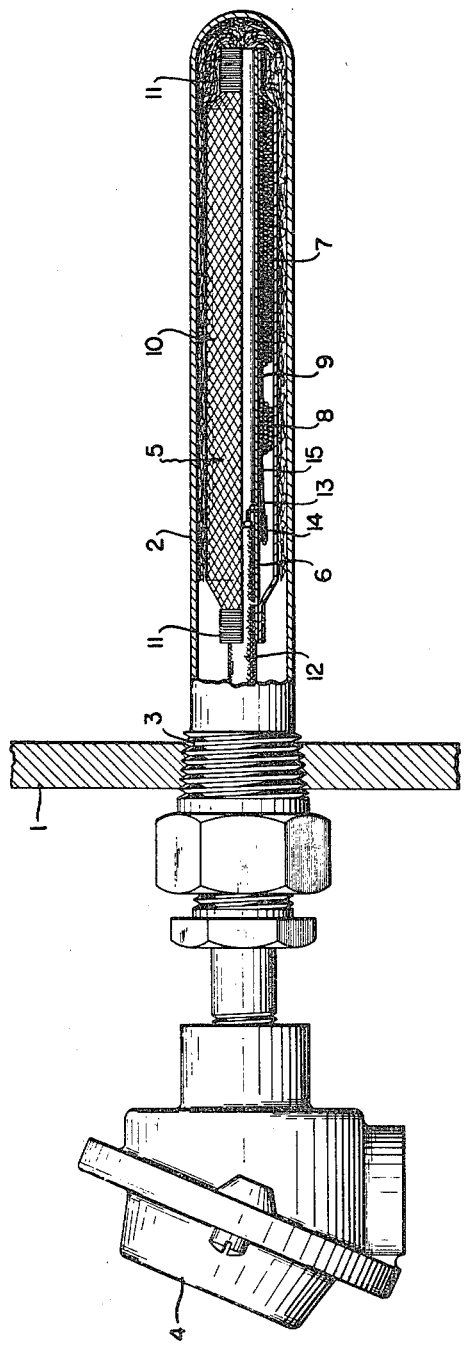
INVENTOR.
PHILEMON J. MOORE
BY
EB Spangenburg
ATTORNEY.

Patented Feb. 4, 1947

2,415,187

UNITED STATES PATENT OFFICE 2,415,187

MEASURING ELEMENT

Philemon J. Moore, Philadelphia, Pa., assignor to The Brown Instrument Company, Philadelphia, Pa., a corporation of Pennsylvania Application June 9, 1944, Serial No. 539,417

4 Claims. (Cl. 201—63)

The present invention relates to thermosensitive elements and particularly to resistance thermometer elements which are mounted in a protective well.

In order to facilitate easy removal of the resistance thermometer element from the protective well, it has been the practice with prior art constructions to provide clearance space between the outer surface of the resistance element and the inner surface of the protective well. The provision of such clearance space is undesirable, however, in that it constitutes a poor heat conducting region with the result that heat transfer to the resistance thermometer element is appreciably retarded. Consequently, the response of the resistance thermometer element to changes in temperature of the region under measurement has been sluggish.

A general object of the present invention is to provide a quick response resistance thermometer element. To the attainment of this end, resilient heat conducting material is provided between the inner surface of the protective well and the sensitive resistance thermometer winding.

A more specific object of the invention is to provide such a resistance thermometer element in which a woven fabric core member having good heat conduction characteristics is utilized as the mounting means for the winding and the resilient heat conducting material comprises a pliable mass of material composed of unravelled end threads of said woven fabric core.

In accordance with the present invention the sensitive winding of the resistance thermometer element is wound on a woven fabric core member of good heat conductivity such as fine copper, brass or other material having good heat transfer characteristics. The resistance wire is wound on only a portion of the length of the woven fabric core, thus allowing an extra portion of the core material which may be unwoven or unravelled. The end threads of the unravelled core portion are utilized to form a pliable mass having good heat conducting characteristics and arranged in cooperative relation with the resistance winding and the protective well to provide a good heat conducting path therebetween. If desired, the end threads may be kinked-up and folded back over the resistance winding so as to provide a continuous path of good heat conduction between the inner surface of the protective tube and the resistance winding along substantially the entire length of the latter.

With this structure, it will be evident that close fitting of the protective well about the resistance thermometer element is not necessary to the attainment of quick response of the resistance thermometer element to changes in temperature to which the entire assembly is subjected inasmuch as the heat conducting path between the protective well and the sensitive resistance element is both continuous and of good heat conducting quality. The continuity of the conducting path is enhanced by virtue of the fact that the resilient and pliable mass between the sensitive resistance element and the protective well is composed of end threads which are integral with the woven fabric core member upon which the sensitive resistance element is wound.

In some forms of my invention it may be advantageous to provide a protective covering of woven fabric such as copper, brass or other material having good heat transfer characteristics for the resistance thermometer element in addition to the protective well. When such a protective covering is employed, an extra portion thereof may be unravelled to provide additional end threads which may also be kinked-up and folded back over the resistance winding to further increase the heat transfer between the protective well and the resistance thermometer element.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

The single figure of drawing shows a portion 1 of a wall enclosing a space whose temperature is to be measured by a resistance thermometer element. For this purpose a closed end protecting tube or well 2 for a resistance thermometer element is inserted through an opening in the wall 1 and is mounted in place by means of tapering screw threads 3 formed on the neck of the protective well. To the left of the threads there is attached a head 4 in which are provided terminals (not shown) to connect the resistance thermometer terminals with lead wires in any usual or standard manner. The lead wires extend to a measuring circuit or instrument (not shown) for obtaining an indication of the changes in resistance value of the resistance thermometer element and thereby for obtaining a measure of the changes in temperature of the region enclosed by the wall 1.

The resistance thermometer element, shown in section and indicated generally by the reference numeral 5, is comprised of a winding of insulated wire, such as Formex insulated wire, wound on a flexible core 6 which may take the form of a woven copper or brass tubing or some other material having good heat conductivity. Formex is the trade name for commercially available insulated wire in which the insulation is believed to be a coating comprising the reaction product of an aldehyde and a hydrolyzed polyvinyl ester applied to the bare wire and may broadly be considered as falling within the class of enamels.

By way of illustration, the resistance thermometer element may be of the same general construction as the resistance thermometer element disclosed in the application Serial Number 391,319 filed by F. P. A. Wagner on May 1, 1941 and issued into Patent 2,357,241 on August 29, 1944. Thus, the winding on the woven fabric core 6 may desirably be of the type known as eccentrically banked windings. By the term eccentrically bank wound is meant a method of winding resistance elements consisting of starting the winding at one end of the core and in a sort of random fashion immediately building up the winding to its full thickness and then progressing linearly along the form in a manner to maintain this thickness substantially constant as the winding proceeds. In this manner a winding having numerous and large interstices is developed. By virtue of this construction the resistance thermometer element is characterized in that both the core member 6 and the winding itself have a large number of interstices throughout the entire structure, and furthermore, both the core member and winding, when untreated, are readily extensible and yielding. The interstices are filled with an impregnating material such as varnish, lacquer or the like. The impregnated structure is then baked to form a moisture impervious resistance element. Because of the large number of interstices in the resistance construction the mass by volume of the structure is predominately impregnating material, and consequently, the temperature coefficient of expansion of the winding construction as a whole is controlled by the impregnating material. Due to the yielding character of the woven fabric core and also of the eccentrically banked winding, the resistance construction is free to expand and contract upon temperature changes without the occurrence of stretching or loosening of the wire winding or cracking of the impregnating material. Hence, stresses and strains due to shrinkage of the impregnating material are avoided inasmuch as any shrinkage takes place uniformly throughout the entire structure, both inside and out.

As shown in the drawing, the resistance winding is comprised of two portions indicated by the numerals 7 and 8, respectively. The wire 8 is a calibrating resistance and may be of manganin wire or the like and may be connected in series with the wire 7 by a soldered connection 9. The wire 7 constitutes the temperature sensitive or responsive element and for example may be comprised of nickel. The relative proportions of the manganin and nickel resistance wires may be chosen as required to shift the characteristic curve of the nickel resistance wire 7 to a desired value. The calibration of a resistance element constructed in this manner is advantageous inasmuch as wire may easily be removed from either the nickel wire 7 or the manganin wire 8 without disturbing the relation of the free ends for connection.

The resistance windings 7 and 8, as seen in the drawing, are covered with a woven fabric tubing 10 of sufficiently large diameter to encompass the winding structures and the ends of which are bound with thread, as at 11, to prevent their fraying. The woven fabric tubing 10 may consist of woven copper or brass tubing or other material having good heat transfer characteristics. When the cover 10 is provided, the whole assembly, including such cover, is impregnated with the impregnating varnish or lacquer utilized. A double conductor asbestos insulated copper wire indicated at 12 is provided for connecting the resistance elements 7 and 8 to a measuring circuit. The lead wire 12 may be anchored directly in the woven fabric tubing 6 as indicated at 13 and connected by soldered joints 14 to extended portions 15 of the resistance wire, as shown.

In accordance with the present invention, the woven fabric core 6 selected as a winding support for the elements 7 and 8 is made considerably longer than required for the winding. The extended portion of the core preferably is not treated with the impregnating material so that it may be readily unravelled or unwound and the threads kinked-up to form a pliable mass extending to the right of the resistance thermometer element. If desired the unravelled threads may also be folded back over the outer surface of the protective covering 10. This pliable mass has good heat transfer characteristics and serves, when the resistance thermometer element 5 is inserted in the closed end protective tube or well 2, to provide a good thermal connecting path between the protecting tube or well and the resistance thermometer element 5. If desired, the pliable mass of end threads may be folded back over both resistance windings 7 and 8 although for many applications it may be sufficient to fold the end threads back over only the resistance element 7 inasmuch as this resistance element is the temperature sensitive element while the resistance element 8 is designed to maintain a substantially constant value regardless of its temperature, and therefore, need not be maintained in good heat transfer relation with the protective well 2.

In this manner any possibility of dead air space between the resistance thermometer element 5 and the protective well 2 is obviated. Moreover, as will be apparent to those skilled in the art, with this construction it is not necessary to hold the dimensions of the resistance thermometer element 5 closely to the inside dimensions of the protective well 2 in order to maintain good heat transfer relation between those parts. Since the end threads of the core member 6 provide a pliable mass, any discrepancy in the dimensions of the resistance thermometer element and the inside dimensions of the protective well 2 will be compensated for by the pliable mass and as a result good heat conduction will be provided between the resistance thermometer element and the protective well. As a consequence, an appreciable reduction in cost of manufacture may be realized.

It will be evident that, if desired, the woven fabric protective covering 10 may be provided with an extra portion or portions beyond one or the other or both of the end positions 11 where it is bound with thread, which portions may be unravelled and kinked-up and folded back over the resistance windings 7 and 8 to further increase the heat transfer between the protective well 2 and the resistance windings. If desired, the protective covering 10 may alone be unravelled to provide the pliable mass of resilient material between the protective well 2 and the resistance thermometer element 5 for increasing the heat transfer therebetween. It may be preferable in some applications to make use of unravelled ends of both the core 6 and the cover 10 for this purpose, however.

Although I have illustrated my invention as applied to a resistance thermometer element with a protective well, it will be understood that my invention is not necessarily restricted to such use and may be advantageously employed in other applications, such as in wet and dry bulb hygrometer applications, where it is desired to provide good heat transfer between a protective well or tube and a sensitive element mounted therein.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described my invention, what I claim as new and desire to secure by Letters Patent, is:

1. The combination with a protective well and a thermosensitive element mounted on a woven metallic core and inserted in said protective well, of means to assist in heat transfer between the thermosensitive element and protective well comprising a mass of pliable material between the thermosensitive element and the protective well composed of unravelled and integral threads of said woven metallic core.

2. The combination with a protective well and a temperature sensitive resistance winding wound on a woven metallic core and inserted in said protective well, of means to assist in heat transfer relation between the resistance winding and protective well comprising a mass of pliable material between the resistance winding and the protective well composed of unravelled and integral threads of said woven metallic core.

3. The combination with a protective well and a temperature sensitive resistance wire wound on a woven metallic core having good thermal conduction characteristics and inserted in said protective well, of means to assist in heat transfer between the resistance wire and protective well including a cover for said wound resistance wire comprising a woven metallic tube having good thermal conduction characteristics and a pliable mass between said cover and protective well composed of unravelled and integral threads of said core.

4. The combination with a protective well and a temperature sensitive resistance wire wound on a woven metallic tube having good thermal conduction characteristics and inserted in said protective well, of means to assist in heat transfer between the resistance wire and protective well including a cover for said wound resistance wire comprising a woven metallic tube having good thermal conduction characteristics and a pliable mass between said cover and protective well composed of unravelled and integral ends of said woven fabric tubes.

PHILEMON J. MOORE.

REFERENCES CITED

The following references are of record in the file of this patent:

UNITED STATES PATENTS

| Number | Name | Date |
|---|---|---|
| 2,135,078 | Hubbard, et al. | Nov. 1, 1938 |
| 2,357,241 | Wagner | Aug. 29, 1944 |
| 2,371,288 | Frownfelter | Mar. 13, 1945 |